(12) United States Patent
Rosen (10) Patent No.: US 8,140,554 B2
(45) Date of Patent: Mar. 20, 2012

(54) SHARED VALUE RESOLUTION WITH MULTIPLE RUNTIME CONTAINERS

(75) Inventor: Doug Rosen, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 650 days.

(21) Appl. No.: 12/340,173

(22) Filed: Dec. 19, 2008

(65) Prior Publication Data

US 2010/0161632 A1    Jun. 24, 2010

(51) Int. Cl.
G06F 7/00 (2006.01)
G06F 17/30 (2006.01)

(52) U.S. Cl. ........................ 707/758; 707/793

(58) Field of Classification Search ............ 707/758
See application file for complete search history.

(56) References Cited

U.S. PATENT DOCUMENTS

| | | | | |
|---|---|---|---|---|
| 5,812,759 | A * | 9/1998 | Brooks | 714/57 |
| 5,964,871 | A | 10/1999 | Hester et al. | |
| 6,052,526 | A | 4/2000 | Chatt | |
| 6,427,140 | B1 * | 7/2002 | Ginter et al. | 705/80 |
| 7,349,913 | B2 | 3/2008 | Clark et al. | |
| 7,401,131 | B2 * | 7/2008 | Robertson et al. | 709/220 |
| 7,548,237 | B2 * | 6/2009 | David et al. | 345/420 |
| 2005/0149903 | A1 | 7/2005 | Archambault et al. | |
| 2006/0168585 | A1 | 7/2006 | Grcevski et al. | |
| 2006/0173932 | A1 * | 8/2006 | Cortright et al. | 707/204 |
| 2007/0055674 | A1 * | 3/2007 | Sunada | 707/10 |
| 2007/0074156 | A1 | 3/2007 | Nelson et al. | |
| 2007/0208873 | A1 | 9/2007 | Lu et al. | |
| 2008/0148380 | A1 | 6/2008 | Abzarian et al. | |

OTHER PUBLICATIONS

"International Search Report", Mailed Date: Jul. 1, 2010, Application No. PCT/US2009/067784, Filed Date: Dec. 11, 2009, pp. 9.

"Managed World", Retrieved at <<http://www.managed-world.com/CategoryView,category,Programming.aspx>>, Oct. 23, 2008, pp. 33.

Ok, Sidar, "Lazy Loading with Linq to SQL POCO s", Retrieved at <<http://www.sidarok.net/>>, Oct. 29, 2008, pp. 42.

Barros, et al., "Extension of the Fractal ADL for the Specification of Behaviours of Distributed Components", Retrieved at <<http://dsrg.mff.cuni.cz/publications/Barros-etal-FractalADLBehavior.pdf>>, pp. 1-4.

Bruneton, et al., "Recursive and Dynamic Software Composition with Sharing", Retrieved at <<http://research.microsoft.com/~cszypers/events/wcop2002/04_Bruneton.pdf>>, pp. 1-9.

Bieber, et al., "Openwings: A Service-Oriented Component Architecture for Self-Forming, Self-Healing, Network-Centric Systems (Rev 2.0)", Retrieved at <<http://www.openwings.org/download/specs/openwingswp.pdf>>, pp. 1-11.

* cited by examiner

*Primary Examiner* — Apu Mofiz
*Assistant Examiner* — Mohammad Rahman
(74) *Attorney, Agent, or Firm* — Ogilvie Law Firm (57) ABSTRACT

Policies and services facilitate sharing values between composition containers in an extensible application environment. A value resolver service receives a request from a value resolver which has a value resolution policy. The service identifies other value resolvers which have compatible policies, queries them consistent with the policies involved, obtains values, and supplies them to the requesting value resolver. The value resolution policy specifies an order for searching composition containers, and a visibility for sharing values between composition containers during value resolution; policies may depend on composition container scope. If value resolvers cannot provide values, the value resolver service invokes fault handlers.

20 Claims, 4 Drawing Sheets

SHARED VALUE RESOLUTION WITH MULTIPLE RUNTIME CONTAINERS

BACKGROUND

The functionality of a software application may be extended by a developer by code which is defined as part of the software before the software runs. For instance, software development often includes writing source code, compiling the source into executable machine code or virtual machine code, and linking or otherwise binding the compiled result to previously created code. Such extensions occur at compile-time.

Some architectures allow the functionality of an application to be extended while an end-user is running the application. For example, some applications support plug-ins, which are relatively small pieces of application-specific software that can be loaded by (or on behalf of) an application at runtime. Plug-ins enhance an application, rather than running on their own. Plug-ins are optional, in that the application provides substantial functionality even without plug-ins. Plug-ins are application-specific, being designed and implemented to operate with a particular application, and sometimes even with a particular version of that application. Each application provides its own infrastructure for locating and using the plug-in(s) it supports.

A managed extensibility framework allows an application to both give and receive software functionality, at runtime, in an infrastructure that supports sharing functionality among different applications, as well as application-specific extensions. Such applications are termed "extensible". The managed extensibility framework's infrastructure provides mechanisms for an application to locate and load available extensions, based on signatures and/or other data type information associated with the extensions and the applications.

SUMMARY

Some embodiments provide policies and services for sharing values between composition containers in an extensible application environment. Each composition container has a respective value resolver. A value resolver service receives a value resolution request from a value resolver which has a value resolution policy, and attempts to identify other value resolvers which have compatible value resolution policies. A value resolution policy specifies an order for searching composition container(s) during value resolution, and a visibility for sharing values between composition containers during value resolution; visibility and order may each depend on composition container scope. The value resolver service queries value resolver(s) which have value resolution policies compatible with the value resolution policy of the requesting value resolver. If the value resolution request seeks multiple resolved values, the value resolver service may supply an aggregated set of multiple resolved values it has received as query responses. If value resolvers cannot provide values, the value resolver service may invoke single-use fault handlers.

The examples given are merely illustrative. This Summary is not intended to identify key features or essential features of the claimed subject matter, nor is it intended to be used to limit the scope of the claimed subject matter. Rather, this Summary is provided to introduce—in a simplified form—some concepts that are further described below in the Detailed Description. The innovation is defined with claims, and to the extent this Summary conflicts with the claims, the claims should prevail.

DESCRIPTION OF THE DRAWINGS

A more particular description will be given with reference to the attached drawings. These drawings only illustrate selected aspects and thus do not fully determine coverage or scope.

DETAILED DESCRIPTION

Overview

An extensible application environment may include composition containers which import/export values among one another. In some extensible application environments, import/export follows a strict parent-child model, e.g., a child can import from a parent container, but not vice versa, and containers which lack a common ancestor cannot share values.

Microsoft provides an extensible application environment known as "MEF" ("Managed Extensibility Framework"). MEF provides runtime extensibility without imposing a plug-in model on applications. MEF permits a host application to expose its own extensions and to consume external extensions. Extensions can be reused amongst different applications, and can also be implemented as application-specific. Extensions can depend on one another; MEF connects the extensions automatically, based on types and other constraints. MEF offers discovery mechanisms for an application to locate and load available extensions. MEF also supports tagging extensions with metadata which facilitates querying and filtering.

MEF's core constructs include catalogs and composition containers. A catalog is responsible for discovering extensions, while composition containers coordinate item creation and satisfy dependencies. In MEF, a composable part offers up one or more exports, and may also depend on one or more externally provided services or other imports. A composable part also manages an instance, which can be an object instance of a given type. MEF is extensible; additional composable part implementations can be provided as long as they adhere to specified import/export contracts. Contracts are a bridge between exports and imports. An export contract can include metadata that can be used to filter discovery of the export, e.g., by indicating a specific capability offered by the export.

MEF supports limited sharing between a parent composition container and a child composition container. However, the sharing is only one way, and the parent/child relationship is tightly coupled, e.g., the relationship needs to be known at the time of constructing the child. A child can only have one parent, thus limiting the number of compositions with which it can share.

Some embodiments described herein provide a mechanism for composition containers to resolve requests for values across other composition containers. Some embodiments also provide a mechanism for applying policies to constrain the way in which resolution occurs across the various composition containers in the system. In some embodiments, a single, centralized service organizes the resolution and enforces policy. A custom value resolver can be identified by its scope, resolution preferences, and visibility pursuant to an associated policy. Some embodiments support dynamic sharing, in that sharing does not require knowing a priori what other composition containers exist. Some embodiments provide a resolution fault handling ability to create values (e.g., to create and populate composition containers) at the time of a value resolution request.

Reference will now be made to exemplary embodiments such as those illustrated in the drawings, and specific language will be used herein to describe the same. But alterations and further modifications of the features illustrated herein, and additional applications of the principles illustrated herein, which would occur to one skilled in the relevant art(s) and having possession of this disclosure, should be considered within the scope of the claims.

The meaning of terms is clarified in this disclosure, so the claims should be read with careful attention to these clarifications. Specific examples are given, but those of skill in the relevant art(s) will understand that other examples may also fall within the meaning of the terms used, and within the scope of one or more claims. Terms do not necessarily have the same meaning here that they have in general usage, in the usage of a particular industry, or in a particular dictionary or set of dictionaries. Reference numerals may be used with various phrasings, to help show the breadth of a term. Omission of a reference numeral from a given piece of text does not necessarily mean that the content of a Figure is not being discussed by the text. The inventor asserts and exercises his right to his own lexicography. Terms may be defined, either explicitly or implicitly, here in the Detailed Description and/ or elsewhere in the application file.

As used herein, a "computer system" may include, for example, one or more servers, motherboards, processing nodes, personal computers (portable or not), personal digital assistants, cell or mobile phones, and/or device(s) providing one or more processors controlled at least in part by instructions. The instructions may be in the form of software in memory and/or specialized circuitry. In particular, although it may occur that many embodiments run on workstation or laptop computers, other embodiments may run on other computing devices, and any one or more such devices may be part of a given embodiment.

A "multithreaded" computer system is a computer system which supports multiple execution threads. The term "thread" should be understood to include any code capable of or subject to synchronization, and may also be known by another name, such as "task," "process," or "coroutine," for example. The threads may run in parallel, in sequence, or in a combination of parallel execution (e.g., multiprocessing) and sequential execution (e.g., time-sliced). Multithreaded environments have been designed in various configurations. Execution threads may run in parallel, or threads may be organized for parallel execution but actually take turns executing in sequence. Multithreading may be implemented, for example, by running different threads on different cores in a multiprocessing environment, by time-slicing different threads on a single processor core, or by some combination of time-sliced and multi-processor threading. Thread context switches may be initiated, for example, by a kernel's thread scheduler, by user-space signals, or by a combination of user-space and kernel operations. Threads may take turns operating on shared data, or each thread may operate on its own data, for example.

A "logical processor" or "processor" is a single independent hardware thread. For example a hyperthreaded quad core chip running two threads per core has eight logical processors. Processors may be general purpose, or they may be tailored for specific uses such as graphics processing, signal processing, floating-point arithmetic processing, encryption, I/O processing, and so on.

A "multiprocessor" computer system is a computer system which has multiple logical processors. Multiprocessor environments occur in various configurations. In a given configuration, all of the processors may be functionally equal, whereas in another configuration some processors may differ from other processors by virtue of having different hardware capabilities, different software assignments, or both. Depending on the configuration, processors may be tightly coupled to each other on a single bus, or they may be loosely coupled. In some configurations the processors share a central memory, in some they each have their own local memory, and in some configurations both shared and local memories are present.

"Kernels" include operating systems, hypervisors, virtual machines, and similar hardware interface software.

"Code" means processor instructions, data (which includes constants, variables, and data structures), or both instructions and data.

Throughout this document, use of the optional plural "(s)" means that one or more of the indicated feature is present. For example, "container(s)" means "one or more containers" or equivalently "at least one container".

Whenever reference is made to data or instructions, it is understood that these items configure a computer-readable memory thereby transforming it to a particular article, as opposed to simply existing on paper, in a person's mind, or as a transitory signal on a wire, for example.

Operating Environments

Figure 1:
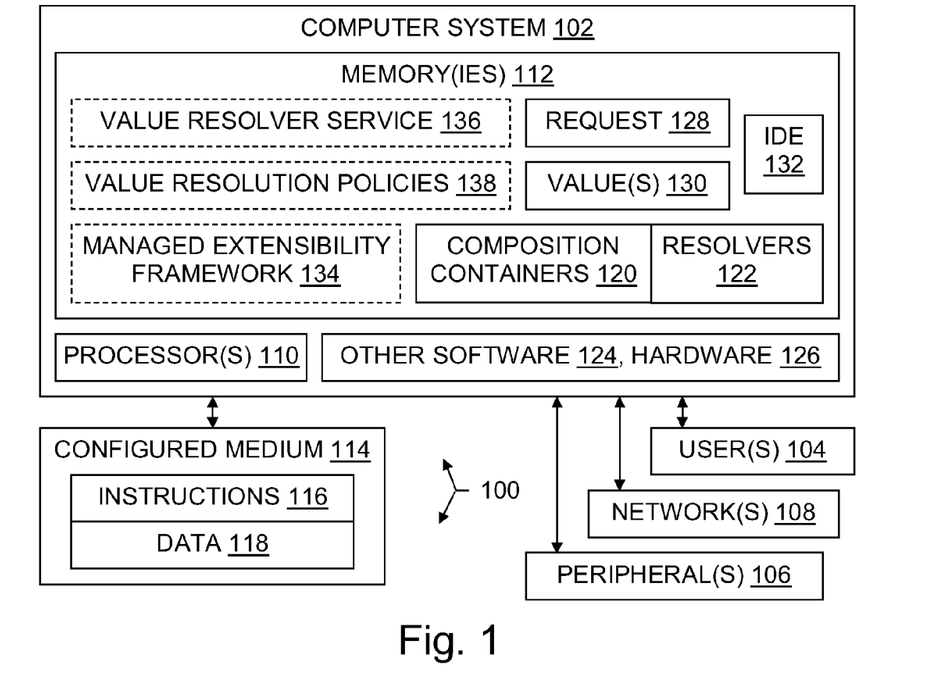
FIG. 1 is a block diagram illustrating a computer system having a processor, a memory, at least two composition containers with respective value resolvers, and other items in an operating environment, and also illustrating configured storage medium embodiments.

With reference to FIG. 1, an operating environment 100 for an embodiment may include a computer system 102. The computer system 102 may be a multiprocessor computer system, or not. An operating environment may include one or more computer systems, which may be clustered, client-server networked, and/or peer-to-peer networked. Some operating environments include a stand-alone (non-networked) computer system.

Human users 104 may interact with the computer system 102 by using displays, keyboards, and other peripherals 106. System administrators, developers, engineers, and end-users are each a particular type of user 104. Automated agents acting on behalf of one or more people may also be users 104. Storage devices and/or networking devices may be considered peripheral equipment in some embodiments. Other computer systems not shown in FIG. 1 may interact with the computer system 102 or with another system embodiment using one or more connections to a network 108 via network interface equipment, for example.

The computer system 102 includes at least one logical processor 110. The computer system 102, like other suitable systems, also includes one or more memories 112. The memories 112 may be volatile, non-volatile, fixed in place, removable, magnetic, optical, and/or of other types. In particular, a configured medium 114 such as a CD, DVD, memory stick, or other removable non-volatile memory medium may become functionally part of the computer system when inserted or otherwise installed, making its content accessible for use by processor 110. The removable configured medium 114 is an example of a memory 112. Other examples of memory 112 include built-in RAM, ROM, hard disks, and other storage devices which are not readily removable by users 104.

The medium 114 is configured with instructions 116 that are executable by a processor 110; "executable" is used in a broad sense herein to include machine code, interpretable code, and code that runs on a virtual machine, for example. The medium 114 is also configured with data 118 which is created, modified, referenced, and/or otherwise used by execution of the instructions 116. The instructions 116 and the data 118 configure the memory 112/medium 114 in which they reside; when that memory is a functional part of a given computer system, the instructions 116 and data 118 also configure that computer system. In some embodiments, a portion of the data 118 is representative of real-world items such as product characteristics, inventories, physical measurements, settings, images, readings, targets, volumes, and so forth. Such data is also transformed as discussed herein.

Memories 112 may be of different physical types. Composition containers 120, their value resolvers 122, other software 124, and other items shown in the Figures may reside partially or entirely within one or more memories 112, thereby configuring those memories. An operating environment may also include other hardware 126, such buses, power supplies, and accelerators, for instance. A composition container 120 can make a request 128, which may be satisfied by value(s) 130 provided by another composition container pursuant to import/export contracts.

A given operating environment 100 may include an Integrated Development Environment (IDE) 132 which provides a developer with a set of coordinated software development tools. In particular, some of the suitable operating environments for some embodiments include or help create a Microsoft® Visual Studio® development environment (marks of Microsoft Corporation) configured to support program development. Some suitable operating environments include Java® environments (mark of Sun Microsystems, Inc.), and some include environments which utilize languages such as C++ or C# ("C-Sharp"), but teachings herein are applicable with a wide variety of programming languages, programming models, and programs, as well as with endeavors outside the field of software development per se that use extensible application environments.

A managed extensibility framework 134, a value resolver service 136, and value resolution policies 138 are shown in outline form in FIG. 1 to indicate that they are not necessarily part of the illustrated operating environment, but may interoperate with items in the operating environment as discussed herein.

Systems

Figure 2:
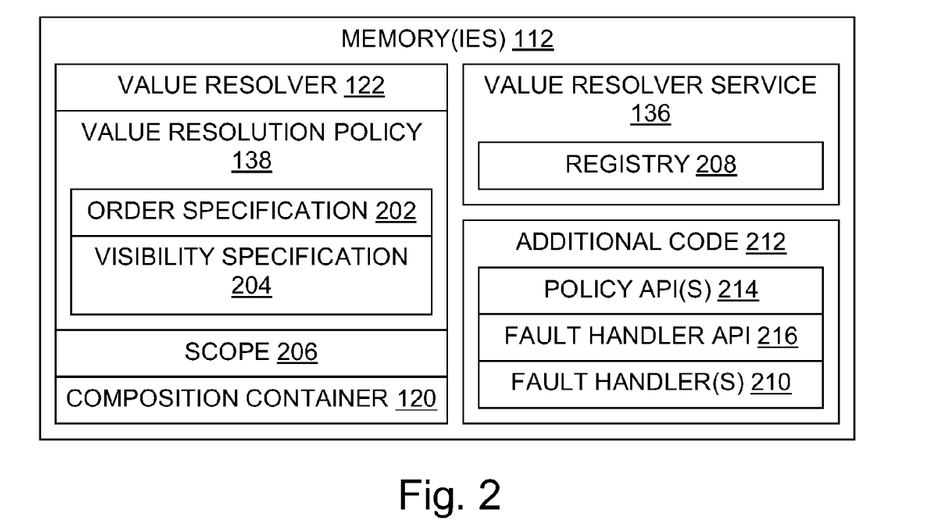
FIG. 2 is a block diagram further illustrating value resolution policies and other value resolution mechanisms.
Figure 3:
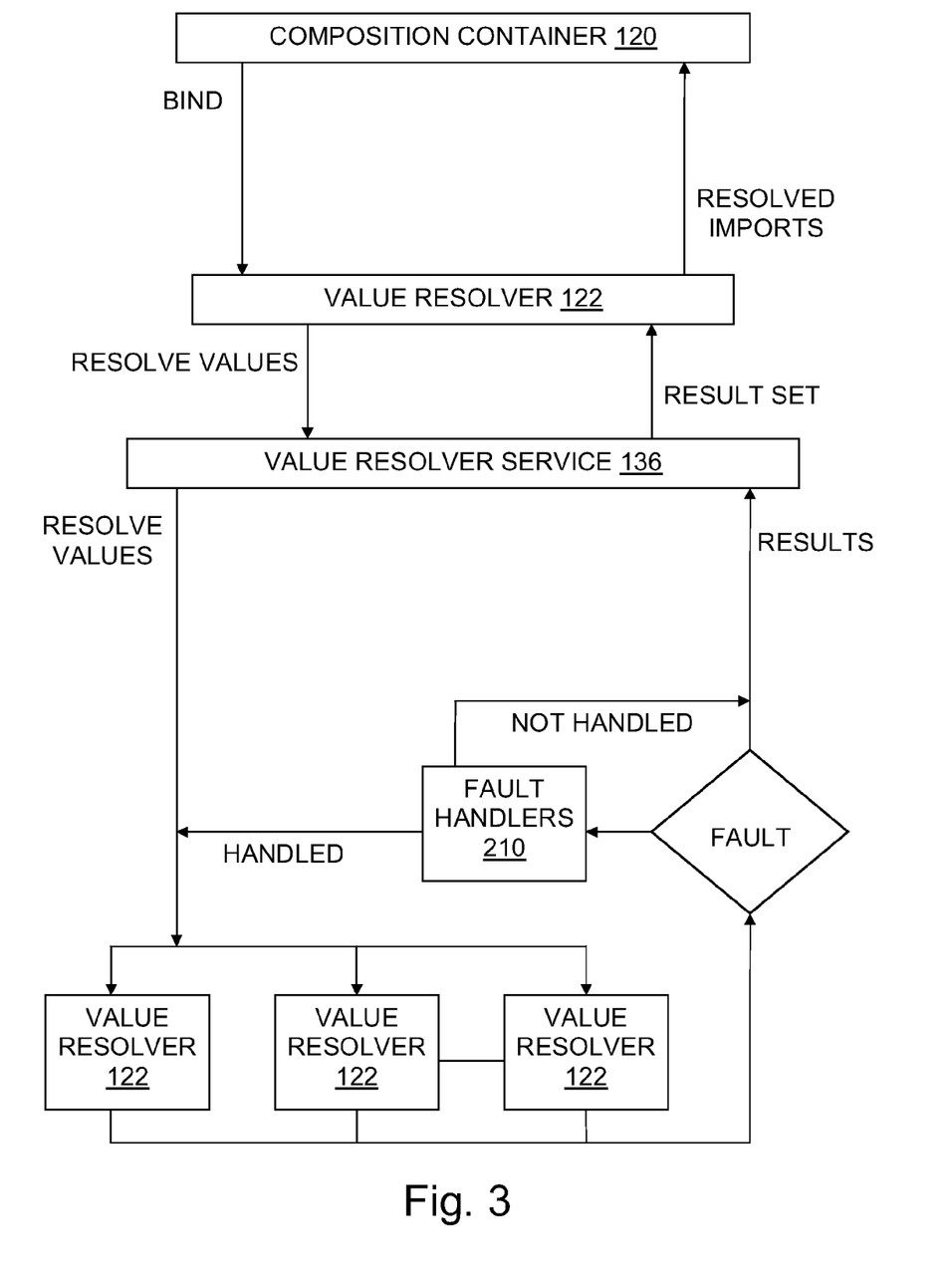
FIG. 3 is a data flow diagram illustrating value resolution in an example architecture.

With reference to FIGS. 1 through 3, some embodiments include a custom value resolver 122, value resolver settings in the form of policies 138, and a coordinating value resolver service 136. The custom value resolver 122 is not a replacement for existing value resolvers 122, including any other custom resolver that might be in use by an owner of a composition container 120. Rather, the custom value resolver 122 is a wrapper of one or more existing value resolvers. The custom value resolver is not designed to prevent an owner of a composition container from performing its own value resolution heuristic, but is instead designed to make those resolved values visible to other composition containers and to allow values from other domains to be a part of set of resolved values 130.

Policies 138 associated with each value resolver 122 include settings that specify the extent to which the composition containers 120 participate in the sharing of values 130.

In some embodiments, policies can specify preferences in an order specification 202, regarding the relative order of composition containers in which values are resolved and/or similar constraints such as "always look in this container" or "never look in this container". In some embodiments, policies can specify limits in a visibility specification 204, such as whether a composition container can use and/or provide values to other composition containers. In some embodiments, policies depend on scope 206 when specifying the set of composition containers that can participate in value sharing with each other.

In some embodiments, when a value resolver 122 is created, it registers itself with a registry 208 of the coordinating value resolver service 136. When a value resolver is asked to resolve a request 128 for one or more values, it passes this request on to the service 136 which then conducts the search according to the policy settings of each value resolver. When a value resolver is deemed to be a participant in the query by virtue of having a policy compatible with the policy of the requesting resolver, the service gets the value resolver that is wrapped by the value resolver and has it attempt to resolve the request for values. After all queries have been conducted, the service 136 aggregates the results and hands them back to the original value resolver that initiated the query.

In some embodiments, the value resolver service 136 also supports registration of fault handlers 210 on a per contract basis. If a query was not satisfied, the service 136 will call any handlers that have been registered for the specified contract. If any of the handlers return true then the query will be attempted a second time. This allows compositions (and therefore values) to be created on demand. Fault handling is a one-shot in some embodiments; once a handler has been called it is removed from the service's internal store and will not be invoked again.

Some embodiments include additional code 212, such as an application program interface (API) 214 for managing policy 138 settings, and an API 216 for managing fault handlers 210.

In a particular system, in which the ability to share values across component domains is provided, individual subsystems are free to define component domains (composition containers) to help satisfy their specific scenarios. For example, a subsystem can be self-contained, in that it can be utilized by various hosts that are or are not MEF aware. The Microsoft Visual Studio® Editor, for example, can provide a package that consists of the assemblies that contain its built-in required or value-add components. When instantiated, directly or via the component model, a root editor service will create its own component domain and populate it with its own components. Building the editor in this way avoids forcing the editor to fit into an existing component domain that has its own set of lifetime and rebinding semantics and value resolution strategy.

As another example, a subsystem might limit the visibility to other components of the values it provides, and the visibility it has of values from other components. For example, two subsystems in an application, in different internal component domains, may each provide services that are to be used by other subsystems that are a part of the application, but not by other components that are brought into the system in a public component domain. However, the application subsystems will be able to obtain values from these public components. In this scenario there is multi-way sharing between the application subsystems and one-way sharing between them and the public component domain.

Some embodiments provide a computer system 102 configured with at least three composition containers 120. Each composition container has a respective value resolver 122. The system also includes logical processor(s) 110 and memory 112 in operable communication with the logical processor(s). The memory is configured with code (e.g., for value resolution policies 138 and a value resolver service 136), and with a value resolution request 128 response in the form of values 130 produced by the system performing with the code a value resolution method as follows. The value resolver service 136 receives a value resolution request 128 from a first value resolver 122 of a first composition container 120. ("First" and "second" are used merely to identify items, not to imply that there are only two such items—there may be two or more.) The first value resolver has a value resolution policy 138 which specifies an order specification 202 (for use in searching composition container(s) during value resolution) and a visibility specification 204 (for use in sharing values between composition container(s) during value resolution). The value resolver service identifies a second value resolver of a second composition container which has a value resolution policy compatible with the value resolution policy of the first value resolver. The value resolver service queries the second value resolver for a value sought in the value resolution request, and then supplies the first value resolver with at least one resolved value, in the value resolution request response.

In some embodiments, the code configuring the memory 112 includes a policy API 214 capable of modifying the value resolution policy of a composition container. For example, in one embodiment an order specification enumerator describes policy using the following preferences that affect the manner in which values are resolved for the composition container initiating the search:

```
        public enum ValueResolutionPreference
        {
            // There is no preference as to the order in which
    this component container is searched for values.
            NoPreference,
            // Values are to be searched for in this component
    container before other component containers are searched.
            BeforeValuesFromOtherContainers,
            // Values are to be searched for in this component
    container after other containers are searched.
            AfterValuesFromOtherContainers,
            // Values are to be searched for only in this
    component container.
            OnlyThisContainer,
            // Values are never to be searched for in this
    component container.
            NeverThisContainer,
            // Values are to be searched for in this component
    container only if none were found in other component
    containers.
            OnlyThisContainerWhenNotInOtherContainers,
        }
```

In one embodiment, the following visibility specification flags describe policy that affects how values from a composition container are shared:

```
        public enum ValueSharingPolicyFlags
        {
            // Do not allow this resolver to provide values to
    or utilize values from other component containers.
            ShareNothing = 0x00000000,
            // Allow this resolver to provide values to other
    component containers.
            ProvideValuesToOthers = 0x00000001,
            // Allow this resolver to utilize values from other
    component containers that belong to the same scope.
            IncludeValuesFromOthersInSameScope = 0x00000002,
            // Allow this resolver to utilize values from other
    component containers that belong to inner scopes.
            IncludeValuesFromOthersInInnerScopes = 0x00000004,
            // Do not rebind as a result of changes that occur
    within other component containers
            DoNotRebind = 0x00000008,
            // Allow this resolver to utilize values from other
    component containers.
            IncludeValuesFromOthers =
    IncludeValuesFromOthersInSameScope |
    IncludeValuesFromOthersInInnerScopes,
            // Allow this resolver to provide values to and
    utilize values from other component containers.
            ShareEverything = ProvideValuesToOthers |
    IncludeValuesFromOthers
        }
```

In one embodiment, the following constructors and other items are also provided in a policy API 214:

```
        public
    ValueResolverSettings(ValueResolutionPreference preference,
    ValueSharingPolicyFlags sharingPolicy) : this (preference,
    sharingPolicy, true) { }
        public
    ValueResolverSettings(ValueResolutionPreference preference,
    ValueSharingPolicyFlags sharingPolicy, bool fullyTrust) :
    this (null, preference, sharingPolicy, fullyTrust) { }
        public ValueResolverSettings(ScopeIdentifier
    scopeId, ValueResolutionPreference preference,
    ValueSharingPolicyFlags sharingPolicy) : this(scopeId,
    preference, sharingPolicy, true) { }
        public ValueResolverSettings(ScopeIdentifier
    scopeId, ValueResolutionPreference preference,
    ValueSharingPolicyFlags sharingPolicy, bool fullyTrust)
            public ScopeIdentifier ScopeId
            public ValueResolutionPreference Preference
            public ValueSharingPolicyFlags SharingPolicy
            public bool FullyTrust
            public void AddPreference(string name,
    ValueResolutionPreference preference)
            public void RemovePreference(string name)
            public void AddPolicy(string name,
    ValueSharingPolicyFlags policy)
            public void RemovePolicy(string name)
            public bool TryGetResolutionPreference(string name,
    out ValueResolutionPreference preference)
            public bool TryGetSharingPolicy(string name, out
    ValueSharingPolicyFlags policy)
```

In some embodiments, the code configuring the memory includes a fault handler API 216 for modifying a set of fault handlers 210 available to the value resolver service 136. For example, one embodiment includes the following:

```
        public void AddResolutionFaultHandler(string
    contractName, ResolutionFaultHandler handler)
        public void
    AddResolutionFaultHandler(IEnumerable<string> contractNames,
    ResolutionFaultHandler handler)
```

In some embodiments, the composition containers 120 are organized in the system according to multiple scopes 206. In some, the scopes 206 include a global scope. The visibility specification 204 and/or order specification 202 may depend in part on composition container scope. For instance, in the example policy API 214 above, some flags refer to inner scope or the same scope, relative to a container which owns the policy. Scope is discussed further below, in connection with FIGS. 4 and 5, for example.

In some embodiments, the code configuring the memory includes a managed extensibility framework 134 designed for managing at least some of the composition containers. For instance, a system may be configured with a Microsoft MEF framework 134.

In some embodiments, the code configuring the memory includes a fault handler 210. In some, the fault handler is registered with the value resolver service, e.g., by a registry 208 entry, and is available to be called by or on behalf of the value resolver service during value resolution. In some embodiments, the fault handler is a single-use handler, which is called only once, e.g., to load a composition container from disk into RAM so the container can provide value(s) 130. In some embodiments, at least one of the composition containers is part of a loadable self-contained subsystem.

It will be understood that a determination of compatibility with regard to policies 138 depends on the policy settings of an embodiment and the specific configuration of composition containers and their value resolvers and policies. In general, "compatible" means logically consistent and capable at least in theory of producing a resolved value. For example, two policies are not compatible if each policy requires that its respective container be searched first before other containers are searched. Likewise, a policy which specifies that a resolver may not provide values to other containers' resolvers is not compatible with a policy that requires values be obtained from other containers. Similarly, a policy that only accepts values from containers in the same scope or an inner scope is not compatible with a policy of a container not in those scopes. By contrast, a policy which specifies no order preference is compatible with a policy that specifies an order preference. Likewise, a policy that prohibits rebinding is orthogonal to, and hence compatible with, a policy that allows value sharing without regard to rebinding or lack of rebinding.

In some embodiments peripherals 106 such as human user I/O devices (screen, keyboard, mouse, tablet, microphone, speaker, motion sensor, etc.) will be present in operable communication with one or more processors 110 and memory 112. However, an embodiment may also be deeply embedded in a system, such that no human user 104 interacts directly with the embodiment. Software processes may be users 104.

In some embodiments, networking interface equipment provides access to networks 108, using components such as a packet-switched network interface card, a wireless transceiver, or a telephone network interface, for example, will be present in the computer system. However, an embodiment may also communicate through direct memory access, removable nonvolatile media, or other information storage-retrieval and/or transmission approaches, or an embodiment in a computer system may operate without communicating with other computer systems.

Methods

Figure 6:
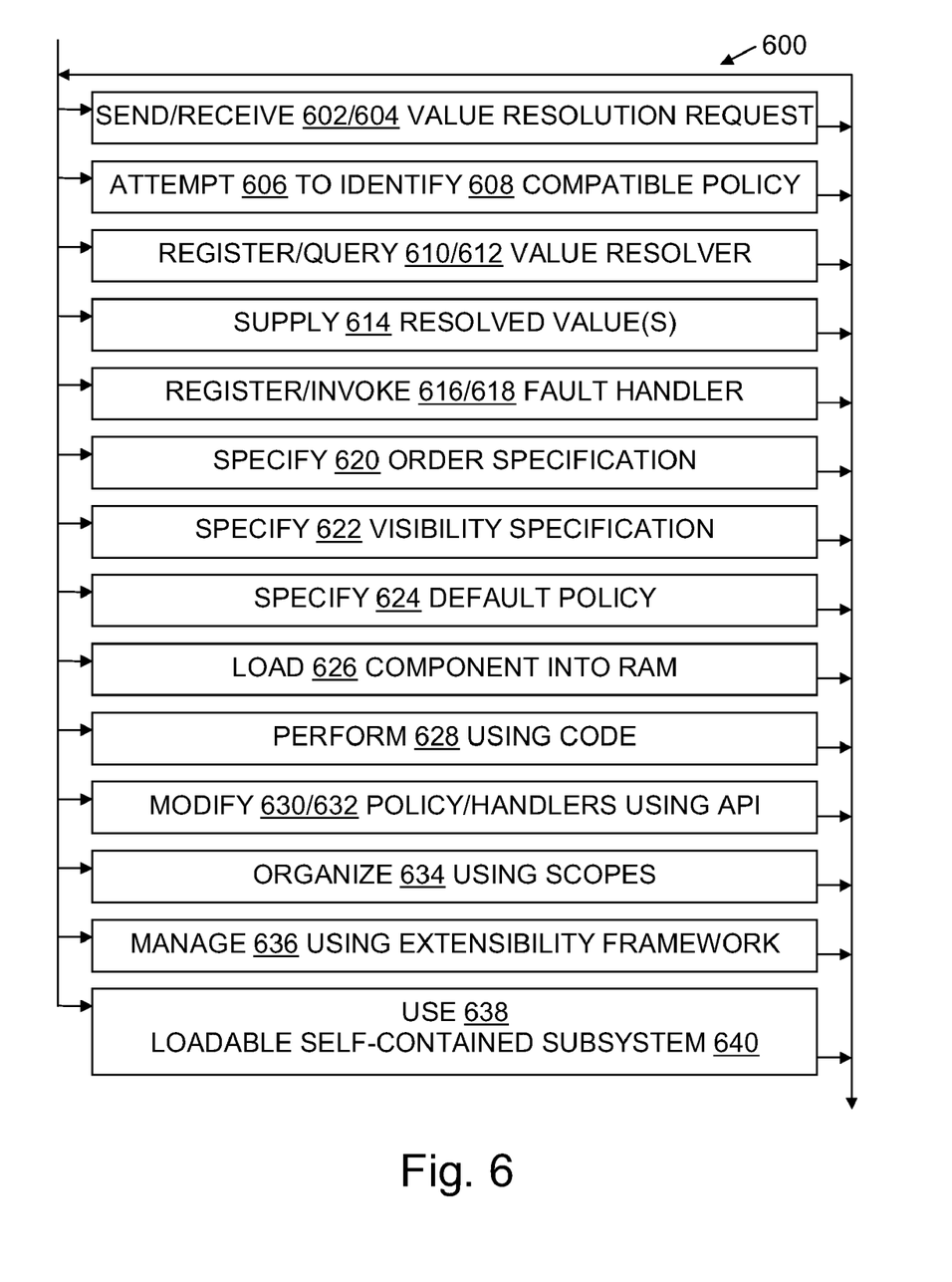
FIG. 6 is a flow chart illustrating steps of some method and configured storage medium embodiments.

FIG. 6 illustrates some method embodiments in a flowchart 600. Methods shown in the Figures may be performed in some embodiments automatically, e.g., by a policy-directed value resolver service 136, value resolvers 122, and composition containers 120 under control of a script requiring little or no user input. Methods may also be performed in part automatically and in part manually unless otherwise indicated. In a given embodiment zero or more illustrated steps of a method may be repeated, perhaps with different parameters or data to operate on. Steps in an embodiment may also be done in a different order than the top-to-bottom order that is laid out in FIG. 6. Steps may be performed serially, in a partially overlapping manner, or fully in parallel. The order in which flowchart 600 is traversed to indicate the steps performed during a method may vary from one performance of the method to another performance of the method. The flowchart traversal order may also vary from one method embodiment to another method embodiment. Steps may also be omitted, combined, renamed, regrouped, or otherwise depart from the illustrated flow, provided that the method performed is operable and conforms to at least one claim.

During a sending step 602, an embodiment sends a value resolution request 128 to a value resolver 122, which sends the request in turn to a value resolver service 136. During a corresponding receiving step 604, a value resolver and/or a value resolver service receives a value resolution request.

During an attempting step 606, a value resolver service attempts to identify 608 at least one (in some cases, all) value resolver(s) whose policy(ies) 138 are compatible with the policy of the value resolver that initiated a value resolution request. If the attempt is successful, or at least partially successful when multiple value resolvers are sought, then identifying step 608 has also occurred. Like other data/command transceiving steps involving composition containers, these steps may be facilitated by a managed extensibility framework 134.

During a registering step 610, an embodiment registers a value resolver 122 with a value resolver service 136.

During a querying step 612, a value resolver service queries one or more compatible value resolvers, seeking value(s) responsive to a value resolution request 128.

During a supplying step 614, a value resolver supplies one or more resolved value(s) responsive to a value resolution request 128 of a querying step 612.

During a registering step 616, an embodiment registers a fault handler 210 with a value resolver service 136.

During an invoking step 618, an embodiment invokes a fault handler 210 to permit value resolution.

During an order specifying step 620, an embodiment specifies a container search order, e.g., in an order specification 202, for use during value resolution. The order may include mandatory and/or merely preferred conditions. The order may depend on container scope(s) 206.

During a visibility specifying step 622, an embodiment specifies a container visibility, e.g., by a visibility specification 204, which may include mandatory and/or merely preferred conditions, for use during value resolution. The visibility may depend on container scope(s) 206.

During a default policy specifying step 624, an embodiment specifies a policy 138 (including, e.g., an order specification and/or a visibility specification) to be used when a value resolver having no explicit policy is encountered during value resolution.

During a loading step 626, an embodiment loads a component, such as one or more composition containers 120, into working memory, e.g., into dynamic RAM addressable by code running on a logical processor 110. Loading may be performed by or on behalf of a fault handler 210, as well as by a managed extensibility framework 134, in some embodiments.

During a performing step 628, one or more of the steps shown in FIG. 6 and/or discussed in the text is performed by an embodiment using code which configures a memory 112, thereby transforming data as specified by the code instructions, under the control of a processor 110.

During a policy modifying step 630, an embodiment modifies a set of available policies 138, e.g., by using an API such as API 214.

During a fault handler modifying step 632, an embodiment modifies a set of available fault handlers 210, e.g., by using an API such as API 216.

During an organizing step 634, an embodiment organizes composition containers 120 in a memory 112 at least in part according to respective scopes 206 of the containers 120. For instance, containers may be organized in scope rings with a global scope 502 and one or more containing scopes 504 according to a scope relationship like the one illustrated in FIG. 5.

During a managing step 636, an embodiment manages composition containers 120 using a managed extensibility framework 134, such as the Microsoft MEF framework 134, for example. Management may include composition container code operations such as cataloging, loading, binding, executing, and deallocating, for instance.

During a using step 638, an embodiment uses a loadable self-contained subsystem 640, e.g., by obtaining a resolved value 130 from and/or providing a resolved value 130 to, the subsystem 640.

The foregoing steps and their interrelationships are discussed in greater detail below, in connection with various embodiments.

Some embodiments provide a method for resolution of values in a computing system containing at least two composition containers, each composition container having a respective value resolver. The method includes a value resolver service receiving 604 a value resolution request from a first value resolver of a first composition container. The first value resolver has at least one value resolution policy which specifies 620 an order specification and/or specifies 622 a visibility specification. The value resolver service attempts 606 to identify a second value resolver of a second composition container which has a value resolution policy compatible with the value resolution policy of the first value resolver. Use of "first" and "second" does not imply a limit of two; although some embodiments have only two value resolvers, other embodiments have more than two value resolvers, for example. In some cases, the value resolver service succeeds in identifying 608 a second value resolver which has a compatible value resolution policy, and the value resolver service queries 612 the second value resolver for a value sought in the value resolution request.

In some embodiments, if no policy is specified expressly for a particular value resolver 122, then a default policy is used. For example, a default policy may be specified 624 to allow full sharing (provide values to others and include values from others in same and inner rings) in the global scope, namely, the innermost scope.

In some situations, it may happen that a value resolver 122 meets the policy requirements for a particular value resolution request 128 from some other value resolver, but is nonetheless unable to supply 614 a value in response to the request. A composition container may have value resolvers that satisfy policy but do not contain the value being sought. The search for values may continue immediately with other value resolver(s), or a fault handler for the value resolver may be invoked 618 and the query then repeated before the search moves on.

In some situations, the value resolution request leads the value resolver service to seek a single resolved value. In such cases, the value resolver service may supply 614 to the first value resolver a single resolved value 130, which is the initial value received as a query response by the value resolver service. In other situations, the value resolution request seeks all resolved values, and the value resolver service supplies 614 to the first value resolver an aggregated set of multiple resolved values received 604 as query responses by the value resolver service.

Figure 5:
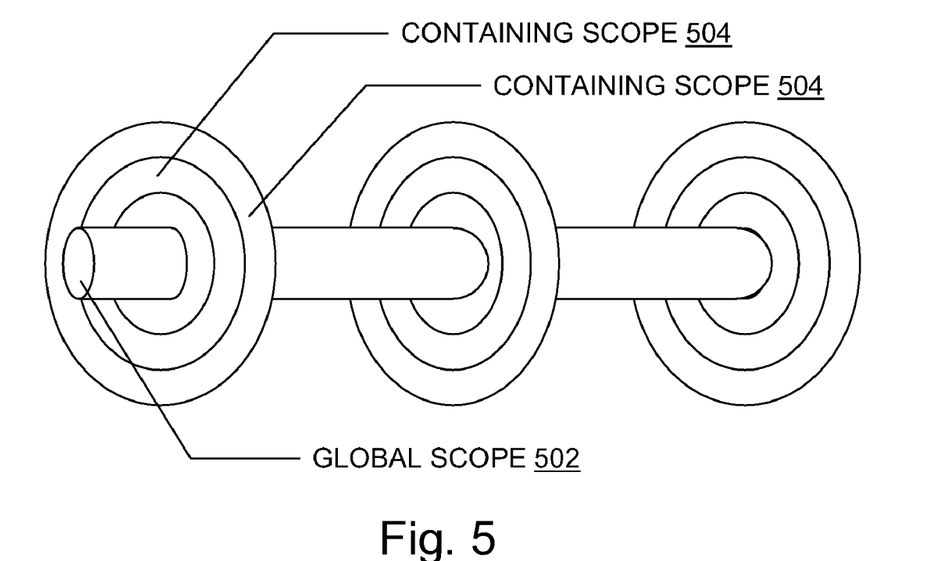
FIG. 5 is a diagram further illustrating scope in the context of value resolution.

In some embodiments, the composition containers have respective scopes, and the resolution policies of the first and second composition containers allow full sharing of values between at least containers in the same scope. Some embodiments define scope in terms of private, local and global rings. Other embodiments use a global scope (which is the innermost scope that is common to everyone), and organize in terms of outer scopes and inner scopes. An example of the latter approach is depicted in FIG. 5. In some embodiments, the value resolver service queries 612 value resolver(s) in the same ring as the first value resolver and then moves inward.

In some embodiments, the value resolver service invokes 618 a single-use fault handler. When there is a request for a single value, fault handlers are invoked if no value is found, even if there are value resolvers that satisfy the policy. When there is a request for a collection of values, the fault handlers are invoked even if values are found. However, after the single-use fault handlers are invoked for a particular contract they are never invoked again.

In some embodiments the method includes registering 610 a value resolver with the value resolver service, so the service will include the value resolver 122 in searches during value resolution. In other embodiments, value resolvers are registered with another system component, which the service can access to locate value resolvers.

Configured Media

Some embodiments include a configured computer-readable storage medium 114, which is an example of a memory 112. Memory 112 may include disks (magnetic, optical, or otherwise), RAM, EEPROMS or other ROMs, and/or other configurable memory. The storage medium which is configured may be in particular a removable storage medium 114 such as a CD, DVD, or flash memory. A general-purpose memory 112, which may be removable or not, and may be volatile or not, can be configured into an embodiment using items such as policies 138 and a service 136, in the form of data 118 and instructions 116, read from a removable medium 114 and/or another source such as a network connection, to form a configured medium. The configured memory 112 is capable of causing a computer system to perform method steps for transforming data through value resolution as disclosed herein. FIGS. 1 through 6 thus help illustrate configured storage media embodiments and method embodiments, as well as system and method embodiments. In particular, any of the method steps illustrated in FIG. 3 and/or FIG. 6, or otherwise taught herein, may be used to help configure a storage medium to form a configured medium embodiment.

Some embodiments provide a computer-readable medium 114 configured with data 118 and instructions 116 for performing a method for resolution of values in a computing system configured by composition containers having value resolvers. The method includes a value resolver service receiving 604 a value resolution request from a first value resolver, the value resolver service identifying 608 a second value resolver which has a value resolution policy compatible with the value resolution policy of the first value resolver, and the value resolver service querying 612 the second value resolver for a value sought in the value resolution request. In some cases, at least one of the composition container resolution policies is specified 624 as a default policy.

In some embodiments, a value resolution policy order specification 202 specifies at least one of the following: there is no preference as to the order in which this composition container is searched for values, values are to be searched for in this composition container before other composition containers are searched, values are to be searched for in this composition container after other composition containers are searched, values are to be searched for only in this composition container, values are never to be searched for in this composition container, values are to be searched for in this composition container only if none were found in other composition containers.

In some embodiments, a value resolution policy visibility specification 204 specifies at least one of the following: do not allow this resolver to provide values to or utilize values from other composition containers, allow this resolver to provide values to other composition containers, allow this resolver to utilize values from other composition containers that belong to the same scope as this composition container, allow this resolver to utilize values from other composition containers that belong to inner scopes relative to this composition container, do not rebind as a result of changes that occur within other composition containers, allow this resolver to utilize values from other composition containers, allow this resolver to provide values to and utilize values from other composition containers. Specifying "do not rebind" means that after retrieval for a value is attempted by a composition container, that container will not attempt again to retrieve the value. For example, if container A imports widgets and container B has two widgets, and container C becomes available later and also has a widget, then container A will never be notified that more widgets are available.

In some embodiments, the method includes invoking 618 a fault handler after no value is supplied in response to the value resolution request despite the presence of at least one value resolver having a value resolution policy which is compatible with the value resolution policy of the first value resolver. In some, the value resolution request seeks multiple values and the method includes loading 626 at least one component into computing system dynamic RAM to allow contribution of value(s) in response to the value resolution request.

Examples are provided above and elsewhere to help illustrate aspects of the technology, but the examples given within this document do not describe all possible embodiments. Embodiments are not limited to the specific implementations, arrangements, displays, features, approaches, or scenarios provided herein. A given embodiment may include additional or different features, mechanisms, and/or data structures, for instance, and may otherwise depart from the examples provided herein. Bearing this is mind, additional descriptions and examples are provided below.

ADDITIONAL EXAMPLES

Some embodiments provide multi-way value resolution across composition containers 120. A composition container serves as a host for component instances and as an isolation boundary between these component instances and others within another composition container. Exports from components and values directly added to a composition container are scoped to that composition container, as are imports by components and explicit requests for values.

Component instance isolation, however, does not have to mean that requests for values within one composition container cannot be resolved by values from other composition containers. In some embodiments, a composition container 120 has one and only one assigned value resolver 122 whose job it is to resolve requests from components within the composition container for values. A value resolver generally scopes its search for values to component instances that are within the initiating composition container, but it is not required to do so. For example, MEF provides an instance of a value resolver called a Parent Resolver that resolves values across two composition containers that have a parent/child relationship.

MEF recognizes that value resolution can be a complex operation, and therefore offers a point of extensibility for this purpose; anyone can create a value resolver that can be used to resolve values for its composition container. Some embodiments described herein provide a mechanism in which multiple composition containers can exist and among which values can be shared.

Sharing values across composition containers may be beneficial. For instance, if the ability to share values across composition containers exists, then individual subsystems are free to define composition containers to help satisfy their specific scenarios. In some scenarios a subsystem is self-contained, in that it can be utilized by various hosts that are or are not MEF aware. An application can provide a package that consists of the assemblies that contain its built-in required or value-add components. When instantiated, directly or via the component model, a root application service will create its own composition container and populate it with its own components. Building the application in this way does not force the application developer fit the application into an existing composition container that has its own set of lifetime and rebinding semantics and value resolution strategy.

In some scenarios, scoped value resolution is beneficial. A subsystem developer might want to limit the visibility, to other components, of the values the subsystem provides, and the visibility the subsystem has of values from other components. For example, two subsystems in an application in different local composition containers may each provide services that are to be used by other subsystems that are a part of the application, but not by other components that are brought into the system via public extensibility, which reside in a global composition container. However, the application subsystems will be able to obtain values from these public components. In this scenario there is multi-way sharing between the containers for the application subsystems and one-way sharing between them and the public composition container.

Some extensibility scenarios involve multiple extensions, with one of the extensions designed to be treated as the default extension. This could be addressed by providing metadata on one extension that identifies it as the default one, or by obtaining the default extension through a different mechanism than the one by which the other extensions are obtained. A difficulty with the first approach is that any extension can specify through the metadata that it is the default extension, leading to ambiguity that would need to be addressed by the consumer. A difficulty with the second approach is that it violates a rule of extensibility, namely, do not expose points of extensibility that you yourself do not contribute. With an appropriate value resolution policy 138 in place for a composition container, however, these difficulties of specifying a default component can be avoided.

Value resolution across compositions has additional considerations. Having multiple composition containers in a single application should not preclude values from being shared across them, unless that is desired. As mentioned above, MEF provides a value resolver that will allow for one-way sharing of value across two composition containers where one is a parent and the other is a child. Some embodiments described herein, however, provide a configurable mechanism that supports multi-way sharing of values between composition containers. To accomplish this multi-way sharing of values, some embodiments use a custom value resolver and a service that can aggregate values from custom resolvers according to a well-defined set of rules.

A VSValueResolver is an example of a custom value resolver. The VSValueResolver is not a replacement for existing value resolvers or any other custom resolver that might be in use by an owner of a composition container. Rather, it is a wrapper of an existing value resolver. This custom value resolver is not meant to prevent an owner of a composition container from performing its own value resolution heuristic, but is meant to help make those resolved values visible to other composition containers and to allow values from other domains to be a part of set of resolved values. It will be understood that names such as "VSValueResolver" may differ in some embodiments. For instance, names shown herein beginning with "VS" may begin instead with "Vs", "value resolvers" may be denoted "export providers", and other name changes may exist.

A VSValueResolver is configurable so that composition container owners can decide the extent to which their composition containers participate in the sharing of values. Three ways in which a VSValueResolver can be configured are (i) by search order preferences, which specify the relative order of composition containers in which values are resolved, (ii) by visibility, which specifies whether a composition container can use or provide values to other composition containers, and (iii) by scope, which specifies the set of composition containers that can participate in value sharing with each other. Any or all of these three constraints can be specified in a value resolution policy 138.

In some embodiments, when a VSValueResolver is created, it registers itself with a value resolver service 136. When a VSValueResolver is asked to resolve a request for one or more values, it passes this request on to the service which conducts the search according to the configurable policy properties of each VSValueResolver. When a VSValueResolver is deemed to be a participant in the query, by virtue of having a compatible policy, the service gets the value resolver that is wrapped by the VSValueResolver and has it attempt to resolve the request for values. After all queries have been conducted, the service aggregates the results and hands them back to the original VSValueResolver that initiated the query. An illustration of this data transformation sequence is shown in FIG. 3, which is a general sequence for resolving values in some embodiments.

In the event of a resolution fault, the service 136 in this embodiment will invoke any registered fault handlers 210 to give them an opportunity to get productions of the requested contract into the component soup, either by adding values directly to the composition container or by creating and populating one or more new composition containers. If any fault handler then returns true, the service will repeat the query. In some embodiments, after the fault handlers are called for a particular contract, they will be removed from the service's registry and will not be called again.

In some scenarios composition containers are designed to participate in two-way sharing with one set of composition containers, and one-way sharing with other composition containers. This allows internal extensibility to which the public cannot contribute, while at the same time allowing internal components to utilize components from the public arena. Such sharing can be accomplished using resolution scope(s) 206. A resolution scope is effectively a container of composition containers that have, by default in some embodiments, two-way sharing amongst them and one way sharing with composition containers within a contained scope.

Figure 4:
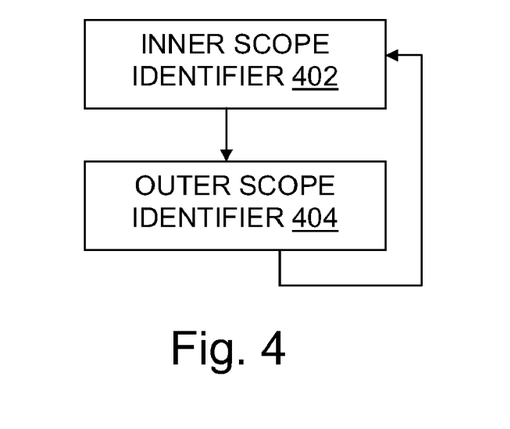
FIG. 4 is a diagram illustrating identifier scopes.

FIG. 4 illustrates scope identifiers. A resolution scope is represented by a scope identifier, which can be either an outer identifier 404, meaning it contains another scope identifier, or an inner identifier 402, meaning it is contained within another scope identifier. FIG. 4 illustrates the relationship between scope identifiers with two levels shown expressly. There is no theoretical limit to the depth of containment of scope identifiers.

One may think of scopes as a set of concentric rings, as shown in FIG. 5, with each ring representing a scope that is identified by a scope identifier. If a scope is meant to contain another scope, then the containing scope is identified by an outer scope identifier, otherwise it is identified by an inner scope identifier. A global scope is the implicit innermost ring of all scope hierarchies, as shown in FIG. 5, and therefore any composition containers within this global scope can provide values with any other composition container in the system.

As FIG. 5 shows, separate scoping rings can exist by creating different inner and outer scope identifiers. In some embodiments, composition containers in a particular scope have the ability to provide values to and obtain values from composition containers in their same scope, to provide values to an outer scope, and to obtain values from composition containers in an inner scope. They do not, however, have the ability to share values with composition containers that are not in their scoping hierarchy.

In some embodiments, a scope can have more than one containing scope. A given scope can be contained within more than one outer scope. In this case, the composition containers in the outer scopes will not share values with each other, but they will be able to obtain values from the same inner scope.

In some embodiments, resolution order for a composition container starts in the ring containing that composition container and moves inward. When resolving multiple values, all values in all composition containers will be returned. However, when resolving a single value the search will end as soon as a value is found.

In some embodiments utilizing MEF, unless otherwise specified, the VSValueResolver will create and wrap a CatalogResolver and place itself into the resolution service as a member of the global scope. To be a part of the local or private scopes, the object identifier for those scopes must be passed to the constructor of the VSValueResolver. Example VSValueResolver constructors include:

```
public VSValueResolver(Catalog catalog)
public VSValueResolver(Catalog catalog, ScopeIdentifier scope)
public VSValueResolver(Catalog catalog, ValueResolverSettings settings)
public VSValueResolver(ValueResolver resolver)
public VSValueResolver(ValueResolver resolver, ValueResolverSettings settings)
```

In some embodiments, the VSValueResolver also allows for resolution preferences to be set on a per XName basis. Settings for a specific XName take precedence to the overall settings specified for the VSValueResolver, using the following examples:

```
public void AddPreference(string name, VSValueResolutionPreference preference)
public void RemovePreference(string name)
```

The only other public methods on the VSValueResolver are the ones that are called by the component model to actually perform the resolution of a value request. There is no need to ever call these methods directly from application-specific code:

```
public override bool TryResolveToValue(string name, out
    IImportInfo value)
public override bool TryResolveToValues(string name, out
    IEnumerable<IImportInfo> values)
```

With regard to bootstrapping subsystems, one useful scenario allows self-contained subsystems 640, that is, subsystems that can be loaded in any host without being concerned with the existence of other components or composition containers. In some embodiments, the only agreed upon contract is that all owners of composition containers utilize the VSValueResolver as their value resolver. The two examples below show how a both a MEF aware and non-MEF aware host can bootstrap subsystems.

With regard to loading subsystems in a MEF aware host, consider the following code:

```
public class SubSystemLoader
{
    [Import]
    public IEnumerable<ISubSystemLoader> Loaders {get;set;}
    public void LoadSubSystems( )
    {
        foreach(ISubSystemLoader loader in this.Loaders)
            loader.Load( );
    }
}
[Export(NameSource=typeof(ISubSystemLoader))]
[ComponentPart(CreationPolicy.Singleton)]
public class EditorLoader : ISubSystemLoader
{
    public void Load( )
    {
        Catalog catalog = new StandardCatalog( );
        VSValueResolverSettings settings = new
VSValueResolverSettings(
            Scopes.Global,
VSValueResolutionPreference.BeforeValuesFromOtherDomains,
            ValueSharingPolicyFlags.ShareEverything);
        VSValueResolver resolver = new VSValueResolver(
            new CatalogResolver(catalog), settings);
        ComponentDomain domain = new
ComponentDomain(resolver);
        // Load editor components into domain...
    }
}
```

The SubSystemLoader class is known by the host and added to the main component domain, and will get all the subsystems loaded. The Import of Loaders imports all the ISubSystemLoader values. The foreach loop iterates through each loader and has it load its subsystem. The Export provides an editor loader class that implements the ISubSystemLoader contract. The VSValueResolverSettings constructor call specifies that this component domain will be a member of the global scope, will have its values searched first, will allow its values to be used by other component domains, and will accept values from other component domains. This code uses an editor as an example, but other applications can be configured similarly.

With regard to loading subsystems in a non-MEF aware host, consider the following code:

```
public class SubSystemLoader
{
    public void LoadEditorSubSystem( )
    {
        EditorLoader loader = new EditorLoader( );
        loader.Load( );
    }
    public void LoadSubSystems( )
    {
        foreach(string file in
Directory.GetFiles(this.subSystemPath, "*.dll"))
        {
            Assembly assembly =
Assembly.Load(AssemblyName.GetAssemblyName(file));
            foreach(Type t in assembly.GetTypes)
            {
                TypeFilter filter = new
TypeFilter(this.InterfaceFilter);
                if (t.FindInterfaces(filter,
"ISubSystemLoader"))
                {
                    ISubSystemLoader loader =
assembly.CreateInstance(t.FullName);
                    loader.Load( );
                    break;
                }
            }
        }
    }
}
```

If the host is specifically aware of the editor, it can simply instantiate the editor's loader class and call the load function LoadEditorSubSystem( ). If the host is unaware of any particular subsystem, it can load all the installed ones via reflection using LoadSubSystems( ). If a type implements the ISubSystemLoader interface, then the FindInterfaces call instantiates it and calls load. This code likewise uses an editor as an example, with the understanding that other applications can be configured similarly.

In some embodiments, an API includes the following VSValueResolver constructors:

```
public VSValueResolver( ) : this(new
    ValueResolverSettings(null,
    ValueResolutionPreference.BeforeValuesFromOtherContainers,
    ValueSharingPolicyFlags.ShareEverything, true)) { }
public VSValueResolver(ValueResolverSettings
    settings)
public VSValueResolver(ComposablePartCatalog
    catalog)
public VSValueResolver(ComposablePartCatalog
    catalog, ScopeIdentifier scope)
public VSValueResolver(ComposablePartCatalog
    catalog, ValueResolverSettings settings)
public VSValueResolver(ValueResolver resolver)
public VSValueResolver(ValueResolver resolver,
    ValueResolverSettings settings)
```

In some embodiments, an API includes the following VSResolverService methods:

```
public static VSResolverService GetService( )
public void
DisposeCompositionContainers(IEnumerable<CompositionContainer>
containerList)
public bool TryGetExportedObject<T>(out T value)
public bool TryGetExportedObject<T>(ScopeIdentifier
scope, out T value)
public bool TryGetExportedObject<T>(string
```

-continued

```
contractName, out T value)
    public bool TryGetExportedObject<T>(ScopeIdentifier
scope, string contractName, out T value)
    public bool TryGetExportedObjects<T>(out
IEnumerable<T> values)
    public bool TryGetExportedObjects<T>(ScopeIdentifier
scope, out IEnumerable<T> values)
    public bool TryGetExportedObjects<T>(string
contractName, out IEnumerable<T> values)
    public bool TryGetExportedObjects<T>(ScopeIdentifier
scope, string contractName, out IEnumerable<T> values)
    public bool TryGetExport<T>(out Export<T> export)
    public bool TryGetExport<T>(ScopeIdentifier scope,
out Export<T> export)
    public bool TryGetExport<T>(string contractName, out
Export<T> export)
    public bool TryGetExport<T>(ScopeIdentifier scope,
string contractName, out Export<T> export)
    public bool TryGetExport<T, TMetadataView>(out
Export<T, TMetadataView> export)
    public bool TryGetExport<T,
TMetadataView>(ScopeIdentifier scope, out Export<T,
TMetadataView> export)
    public bool TryGetExport<T, TMetadataView>(string
contractName, out Export<T, TMetadataView> export)
    public bool TryGetExport<T,
TMetadataView>(ScopeIdentifier scope, string contractName,
out Export<T, TMetadataView> export)
    public bool TryGetExports<T>(out ExportCollection<T>
exports)
    public bool TryGetExports<T>(ScopeIdentifier scope,
out ExportCollection<T> exports)
    public bool TryGetExports<T>(string contractName,
out ExportCollection<T> exports)
    public bool TryGetExports<T>(ScopeIdentifier scope,
string contractName, out ExportCollection<T> exports)
    public bool TryGetExports<T, TMetadataView>(out
ExportCollection<T, TMetadataView> exports)
    public bool TryGetExports<T,
TMetadataView>(ScopeIdentifier scope, out
ExportCollection<T, TMetadataView> exports)
    public bool TryGetExports<T, TMetadataView>(string
contractName, out ExportCollection<T, TMetadataView>
exports)
    public bool TryGetExports<T,
TMetadataView>(ScopeIdentifier scope, string contractName,
out ExportCollection<T, TMetadataView> exports)
```

CONCLUSION

Although particular embodiments are expressly illustrated and described herein as methods, as configured media, or as systems, it will be appreciated that discussion of one type of embodiment also generally extends to other embodiment types. For instance, the descriptions of methods in connection with FIG. 6 also help describe configured media, and help describe the operation of systems and manufactures like those discussed in connection with other Figures. It does not follow that limitations from one embodiment are necessarily read into another. In particular, methods are not necessarily limited to the data structures and arrangements presented while discussing systems or manufactures such as configured memories.

Not every item shown in the Figures need be present in every embodiment. Conversely, an embodiment may contain item(s) not shown expressly in the Figures. Although some possibilities are illustrated here in text and drawings by specific examples, embodiments may depart from these examples. For instance, specific features of an example may be omitted, renamed, grouped differently, repeated, instantiated in hardware and/or software differently, or be a mix of features appearing in two or more of the examples. Functionality shown at one location may also be provided at a different location in some embodiments.

Reference has been made to the figures throughout by reference numerals. Any apparent inconsistencies in the phrasing associated with a given reference numeral, in the figures or in the text, should be understood as simply broadening the scope of what is referenced by that numeral.

As used herein, terms such as "a" and "the" are inclusive of one or more of the indicated item or step. In particular, in the claims a reference to an item generally means at least one such item is present and a reference to a step means at least one instance of the step is performed.

Headings are for convenience only; information on a given topic may be found outside the section whose heading indicates that topic.

All claims as filed are part of the specification.

While exemplary embodiments have been shown in the drawings and described above, it will be apparent to those of ordinary skill in the art that numerous modifications can be made without departing from the principles and concepts set forth in the claims. Although the subject matter is described in language specific to structural features and/or methodological acts, it is to be understood that the subject matter defined in the appended claims is not necessarily limited to the specific features or acts described above the claims. It is not necessary for every means or aspect identified in a given definition or example to be present or to be utilized in every embodiment. Rather, the specific features and acts described are disclosed as examples for consideration when implementing the claims.

All changes which come within the meaning and range of equivalency of the claims are to be embraced within their scope to the full extent permitted by law.

What is claimed is:

1. A method for resolution of values in a computing system containing at least two composition containers, each composition container having a respective value resolver, the method comprising the steps of:
   a value resolver service receiving a value resolution request from a first value resolver of a first composition container, the first value resolver having at least one value resolution policy which specifies at least one of the following: an order specification for use in searching composition container(s) during value resolution, a visibility specification for use in sharing values between composition containers during value resolution; and
   the value resolver service attempting to identify a second value resolver of a second composition container which has a value resolution policy compatible with the value resolution policy of the first value resolver.

2. The method of claim 1, further comprising:
   the value resolver service identifying a second value resolver of a second composition container which has a value resolution policy compatible with the value resolution policy of the first value resolver; and
   the value resolver service querying the second value resolver for a value sought in the value resolution request.

3. The method of claim 2, wherein the value resolution request seeks a single resolved value, and the method further comprises the value resolver service supplying to the first value resolver a single resolved value which is the initial value received as a query response by the value resolver service.

4. The method of claim 2, wherein the value resolution request seeks multiple resolved values, and the method further comprises the value resolver service supplying to the first value resolver an aggregated set of multiple resolved values received as query responses by the value resolver service.

5. The method of claim 2, wherein the composition containers have respective scopes, and the resolution policies of the first and second composition containers allow full sharing of values between containers in the same scope.

6. The method of claim 1, further comprising the value resolver service invoking a single-use fault handler.

7. The method of claim 1, further comprising registering a value resolver with the value resolver service.

8. A computer-readable medium configured with data and instructions for performing a method for resolution of values in a computing system containing at least two composition containers, each composition container having a respective value resolver, the method comprising the steps of:
- a value resolver service receiving a value resolution request from a first value resolver of a first composition container, the first value resolver having at least one value resolution policy which specifies an order specification for use in searching composition container(s) during value resolution and a visibility specification for use in sharing values between composition containers during value resolution;
- the value resolver service identifying a second value resolver of a second composition container which has a value resolution policy compatible with the value resolution policy of the first value resolver; and
- the value resolver service querying the second value resolver for a value sought in the value resolution request.

9. The configured medium of claim 8, wherein an order specification of at least one of the composition container resolution policies specifies at least one of the following:
- there is no preference as to the order in which this composition container is searched for values,
- values are to be searched for in this composition container before other composition containers are searched,
- values are to be searched for in this composition container after other composition containers are searched,
- values are to be searched for only in this composition container,
- values are never to be searched for in this composition container,
- values are to be searched for in this composition container only if none were found in other composition containers.

10. The configured medium of claim 8, wherein a visibility specification of at least one of the composition container resolution policies specifies at least one of the following:
- do not allow this resolver to provide values to or utilize values from other composition containers,
- allow this resolver to provide values to other composition containers,
- allow this resolver to utilize values from other composition containers that belong to the same scope as this composition container,
- allow this resolver to utilize values from other composition containers that belong to inner scopes relative to this composition container,
- do not rebind as a result of changes that occur within other composition containers,
- allow this resolver to utilize values from other composition containers,
- allow this resolver to provide values to and utilize values from other composition containers.

11. The configured medium of claim 8, wherein at least one of the composition container resolution policies is specified as a default policy.

12. The configured medium of claim 8, wherein the method further comprises invoking a fault handler after no value is supplied in response to the value resolution request despite the presence of at least one value resolver having a value resolution policy which is compatible with the value resolution policy of the first value resolver.

13. The configured medium of claim 8, wherein the value resolution request seeks multiple values and the method further comprises loading at least one component into computing system dynamic RAM to allow contribution of value(s) in response to the value resolution request.

14. A computer system configured with at least three composition containers, each composition container having a respective value resolver, the system further comprising:
- a logical processor; and
- a memory in operable communication with the logical processor, the memory configured with code and with a value resolution request response produced by the system performing with the code a method having at least the following steps:
  - a value resolver service receiving a value resolution request from a first value resolver of a first composition container, the first value resolver having at least one value resolution policy which specifies an order specification for use in searching composition container(s) during value resolution and a visibility specification for use in sharing values between composition containers during value resolution;
  - the value resolver service identifying a second value resolver of a second composition container which has a value resolution policy compatible with the value resolution policy of the first value resolver;
  - the value resolver service querying the second value resolver for a value sought in the value resolution request; and
  - the value resolver service supplying to the first value resolver at least one resolved value within the value resolution request response.

15. The system of claim 14, wherein the code configuring the memory comprises at least one API for modifying the value resolution policy of a composition container.

16. The system of claim 14, wherein the code configuring the memory comprises at least one API for modifying a set of fault handlers available to the value resolver service.

17. The system of claim 14, wherein the composition containers are organized in the system according to multiple scopes which include a global scope, and the visibility specification depends at least in part on composition container scope.

18. The system of claim 14, wherein the code configuring the memory further comprises a managed extensibility framework for managing at least some of the composition containers.

19. The system of claim 14, wherein the code configuring the memory further comprises a single-use fault handler registered with and available to the value resolver service.

20. The system of claim 14, wherein at least one of the composition containers is part of a loadable self-contained subsystem.

\* \* \* \* \*